Jan. 26, 1954  J. LETHCOE  2,667,569
DETACHABLE LIGHT FOR MOTOR TRUCKS AND TRAILERS
Filed Oct. 28, 1949

INVENTOR
JOSEPH LETHCOE
By Toulmin & Toulmin
ATTORNEYS

Patented Jan. 26, 1954

2,667,569

UNITED STATES PATENT OFFICE 2,667,569

DETACHABLE LIGHT FOR MOTOR TRUCKS AND TRAILERS

Joseph Lethcoe, Springfield, Ohio

Application October 28, 1949, Serial No. 124,175

1 Claim. (Cl. 240—8.3)

This invention relates to night lights for vehicles. More particularly it relates to detachable safety and clearance lights for trucks and trailers.

Trucks and trucks with trailers do a considerable portion of their traveling between the hours of sunset and dawn. This travel is done in all types of weather. As a result stringent safety rules have been promulgated to insure adequate lighting on these vehicles.

In order to prevent sideswiping, clearance lights are required. There is also a requirement of multiple red lights on the rear to prevent rear end collisions.

While multiplicity of lights is an advantage, it does not always insure that the lights will be bright enough for their intended purpose. Except for the normal tail light, most of the lights on large trailers are inaccessible except in a garage where ladder equipment is available. Thus, if bulbs burn out there is no way of immediately reestablishing adequate lighting. Further, the lights become covered with mud and the like, reducing the visibility of light to a few feet. Thus, the inaccessibility prevents ready repair and cleaning.

It is an object of the present invention to overcome the disadvantages and limitations of the above methods.

It is a further object of the present invention to provide lights which are readily attachable to and detachable from the vehicle.

It is another object of this invention to provide lights which may be readily inspected, repaired and cleaned because of attachment in accessible positions.

It is also an object of the present invention to provide lights which are readily replaceable without interfering with the balance of equipment coupled in the electrical circuit.

It is still a further object of this invention to provide a simple system transferable from one vehicle to another for quick rigging of adequate safety lighting.

These and other objects and advantages will be apparent to one skilled in the art as the following description proceeds.

This invention comprises in a vehicle a wire electrical system having spaced sockets and at various positions on the vehicle there are detachably mounted safety lights which have a wire connection for plugging in the socket.

This system may be entirely independent of the vehicle's built-in electrical system or may run with independent wiring from the battery of the vehicle.

The invention will be better understood by reference to the drawing in which.

Figure 1:
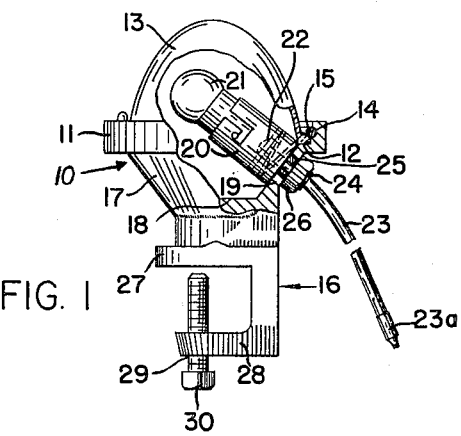
Figure 1 is an elevational view of a single light.
Figure 4:
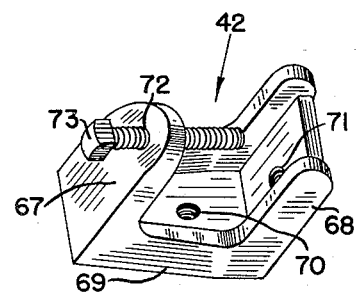
Figure 4 is a perspective view of the attachment bracket.

In the drawings, the light of Figure 1 is shown as a casting 10, although for the purposes of this invention the unit need not be a unitary fixture. Casting 10 is formed with a head portion 11. The head 11 is machined internally to form a shoulder 12 which is the seat for a glass dome or equivalent face 13.

Adjacent the shoulder 12 the interior of head 11 is undercut to form a recess 14 adapted to receive a flexible retainer ring 15 which holds the glass dome 13 in place.

Head section 11 is joined to the integral bracket base 16 through a conical section 17. Section 17 is machined to form a recess 18. Mounted on the wall 19 of the recess 18 is a socket 20 adapted to receive an electric light bulb 21.

Socket 20 is provided with a suitable spring biased contact 22 receiving electric current through attached wire or conductor 23, which is provided at its opposite end with a conducting metal tip 23a adapted to fit into hereinafter explained electrical sockets. Wire 23 passes from the outside to the inside of conical section 17 through the hollow core of an externally threaded projection 24 of socket 20. This projection is adapted for sliding fit with an aperture 25 in the wall 19. The socket 20 is secured by suitable locking means 26, such as a nut, threadedly engaging projection 24.

Bracket base 16 consists of an upper jaw 27 and a substantially parallel spaced ear 28. Ear 28 is provided with a threaded port 29 adapted to receive a set screw 30.

Figure 2:
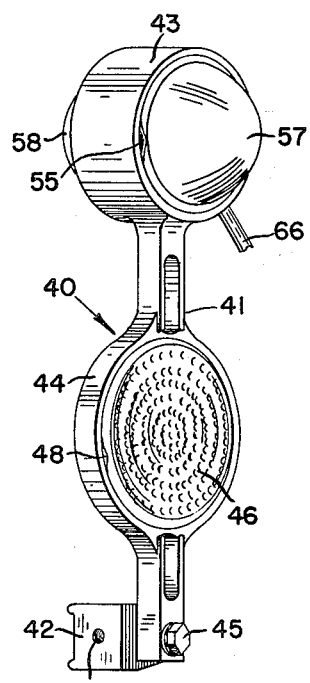
Figure 2 is a side elevational view of a double light.
Figure 3:
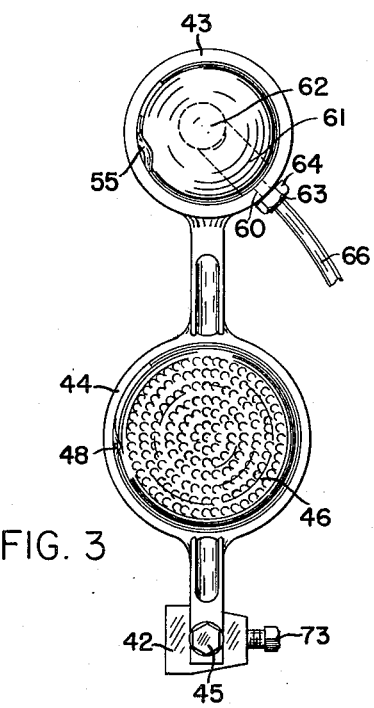
Figure 3 is a back elevational view of the light illustrated in Figure 2.

In Figures 2 and 3 there is shown another model of the light adapted to throw a clearance indicating light in forward position and a red light rearwardly. This light 40 is formed with a standard 41 attached at one end to a C-shaped bracket 42 and at the other end to a circular head 43.

Standard 41 also has an expanded portion 44 intermediate the ends thereof. Standard 41 is joined to bracket 42 by suitable means 45, such as set screws, welding, or the like. However, it is preferred that the attachment be by set screw in order to permit positioning of the standard in any angular position through a plane of 360 degrees.

Expanded section 44 is adapted to receive and to hold reflector unit 46 by means of an undercut recess adapted to receive a flexible retainer ring 48.

Circular head 43 is of hollow tubular construction. The inner surface of head 43 is machined to form shoulders adjacent the lips of said head. The lips are undercut to form recesses, corresponding to recess 14 of Figure 1, adapted to receive flexible retainer rings as at 55 for holding glass domes or equivalent transparent faces 57 and 58 against said shoulders.

Circular head 43 is provided with a radially extending port 60. Mounted within the circular head 43 is a socket 61 adapted to receive an electric light bulb 62.

Socket 61 is provided with an externally threaded tubular projection 63 adapted for sliding fit with said port 60 and to be secured to head 43 by suitable locking means 64, such as a nut.

Socket 61 is provided with a suitable spring biased contact, such as contact 22 of Figure 1, receiving electric current through wire 66 brought into the head 43 through the tubular projection 63 of socket 61.

Bracket 42 consists of two spaced jaw members 67 and 68 joined by back member 69. Members 68 and 69 are provided with threaded apertures 70 and 71, respectively, adapted to receive the threaded portion of a set screw 45.

Jaw member 67 is provided with a threaded aperture 72 adapted to receive the threaded portion of a set screw 73.

When the lights of this type are to be installed a single insulated wire having sockets for plugging in units is strung around the vehicle. A light unit is then attached to some projection, such as a bumper, door handle, body brace, or the like, by means of the bracket 42 and the set screw 73. A wire connection of one or more lights is plugged into the sockets and the auxiliary system is complete.

Figure 5:
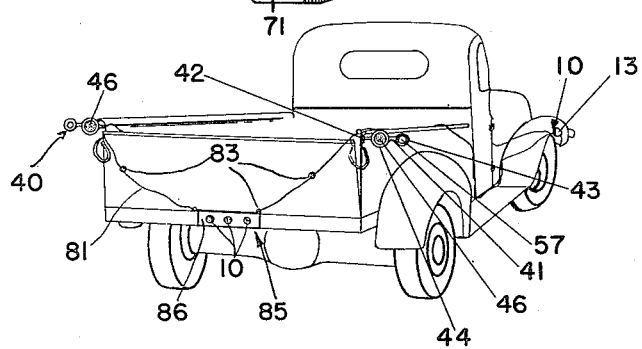
Figure 5 is a perspective view of a truck having a light of the type shown in Figures 1 and 2 mounted thereon.

The installation is illustrated in Figure 5 wherein there is shown a pickup truck. The trailer or towed vehicle may be of any desired size.

A wire 81 is shown mounted on the truck by suitable means, such as clamps, U-shaped nails, or the like. Wire 81 is provided at spaced intervals with small electrical sockets 83.

In this figure a unit 10 (Figure 1) is shown mounted on the fender of the truck to act as a clearance light.

Also shown are two units 40 attached to each side of the rear of the truck and being hooked into the electrical system through connectors 66 plugged into sockets 83.

In order to comply with regulations governing vehicles traveling in interstate commerce, the towed vehicle must be provided with a so-called bar light.

A bar light 85 meeting regulations is shown which consists of three units 10, mounted six inches apart on a metal base 86. This base is clamped to the body of the truck. Electrical power connection is made to wire 81 through the sockets 83.

While the invention is illustrated with relation to two lights, it will be recognized that as many lights as are needed for proper protection may be mounted on a vehicle.

If the wire system is a single wire system then the socket 61 is grounded to the vehicle through the bracket 42 and set screw 72 to complete the electrical circuit.

It will at once be recognized that a driver may by this system carry with him an auxiliary light system for installation on any trucks or trailers of any size whose parts are all interchangeable to allow variation as circumstances require.

It will also be apparent that with this equipment he can deliver a truck and in a few minutes transfer his auxiliary equipment and drive off with a different vehicle having adequate auxiliary lighting equipment.

It will be understood that this invention is susceptible to modification in order to adopt it to different usages and conditions and, accordingly, it is desired to comprehend such modifications within this invention as may fall within the scope of the appended claim.

I claim:

A detachable safety light feature for mounting on vehicles to indicate clearance in forward and rearward directions and a reflector stop light for reflecting light in a rearward direction, said light fixture comprising an elongated standard having an expanded circular opening intermediate the ends thereof, a tubular head band on one end of said standard having an axis disposed substantially parallel to the axis of said circular opening, illumination means for indicating clearance positioned in said head band adapted to simultaneously emit light forwardly and rearwardly of said standard, a light reflector means in said circular opening for reflecting light rearwardly of said standard, a C-shaped bracket comprising a pair of spaced parallel jaw members joined integrally by a back member, each of said spaced jaw members and back member having a threaded aperture extending therethrough receiving a set screw therein, the back member of said C-shaped bracket being connected to the other end of said standard and one of said set screws in combination with one of said jaw members comprising means for adjustably attaching said bracket to a supporting base on a vehicle.

JOSEPH LETHCOE.

References Cited in the file of this patent

UNITED STATES PATENTS

| Number | Name | Date |
|---|---|---|
| 1,443,945 | Cappell | Feb. 6, 1923 |
| 1,828,233 | Smith | Oct. 20, 1931 |
| 1,893,303 | Philips | Jan. 3, 1933 |
| 1,984,817 | Stein | Dec. 18, 1934 |
| 2,024,858 | Highfill | Dec. 17, 1935 |
| 2,208,154 | Daehler | July 16, 1940 |
| 2,370,824 | Trautner | Mar. 6, 1945 |
| 2,383,202 | Lawson | Aug. 21, 1945 |
| 2,465,085 | Griffiths | Mar. 22, 1949 |